Figure 1:
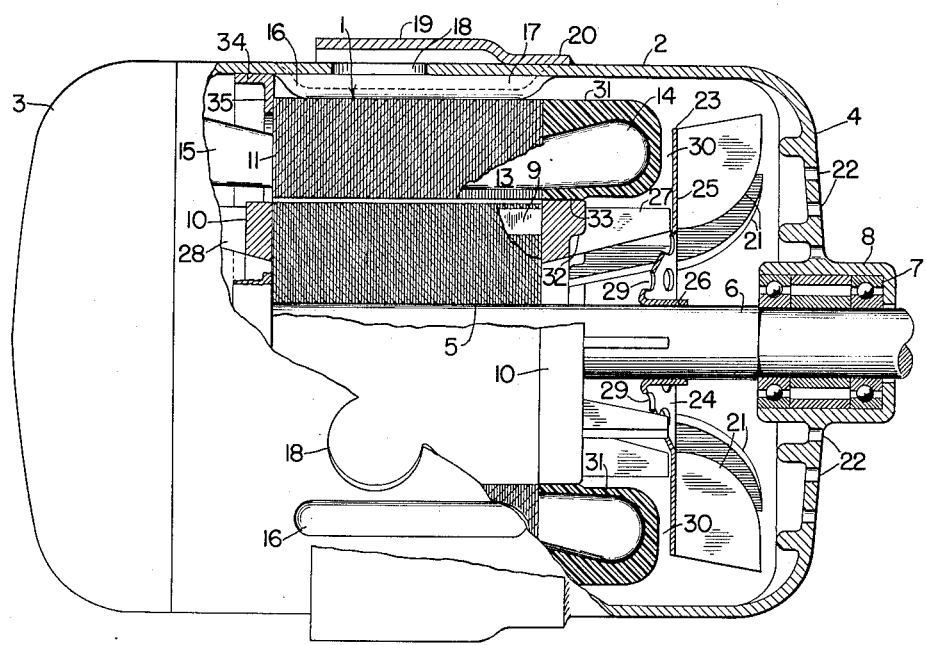

Jan. 10, 1961  R. S. WATERS  2,967,959
VENTILATING APPARATUS FOR DYNAMOELECTRIC MACHINES
Filed June 21, 1957

INVENTOR.
ROBERT S. WATERS
BY
Andrus, Sceales & Starke
Attorneys

United States Patent Office 2,967,959
Patented Jan. 10, 1961

2,967,959

VENTILATING APPARATUS FOR DYNAMO-ELECTRIC MACHINES

Robert S. Waters, Feeding Hills, Mass., assignor to A. O. Smith Corporation, Milwaukee, Wis., a corporation of New York Filed June 21, 1957, Ser. No. 667,118

7 Claims. (Cl. 310—63)

This invention relates to ventilating apparatus for a dynamoelectric machine.

Certain motors require forced air cooling to prevent burnout of the motor. Various devices have been incorporated in the motor to draw air in through one end of the motor and after passing the air over the various components to be cooled discharging the air from the motor. Unless some method is provided for protecting the field winding from foreign matter carried in with the incoming air, there is substantial danger of damage and destruction of the winding.

Elaborate and complicated arrangements have been devised to direct the cooling air for maximum efficiency and to protect the field winding.

In accordance with the present invention, a two-stage fan arrangement is provided in one end of the motor. The first stage includes a radial plate-like support secured to the motor shaft and having axially extended fan blades on its outer periphery. Intermediate the shaft and the fan blades, the support is perforated to allow free passage of air past the support. The second stage includes fan blades which are preferably integrally cast with the rotor bars adjacent the perforated support surface. The second stage draws air in through the perforations and discharges it outwardly between the field winding and the fan support. A plurality of longitudinal passages are provided between the stator core and the motor frame. An opening for each passage is provided in the frame intermediate the length of the passages to discharge the air from the motor. To protect the stator winding from foreign matter carried by the cooling air, the end of the winding adjacent the fan arrangement is enveloped by a suitable plastic material adapted to carry away the heat generated within the winding. The opposite end of the winding is sealed from the cooling air by a baffle which seals the passages and prevents the air from entering the end of the motor adjacent the windings. An annular embossment is provided on the end ring or the like adjacent the fan end of the motor and the plastic enclosure for the stator winding. A very small running clearance is provided therebetween to prevent foreign matter from passing along the motor air gap to the unprotected winding.

The present invention provides a simple and easily fabricated two-stage motor ventilating system having a high volume of air flow. Further, the assembly is relatively low in cost.

The drawing illustrates the best mode presently contemplated for carrying out the invention.

Figure 2:
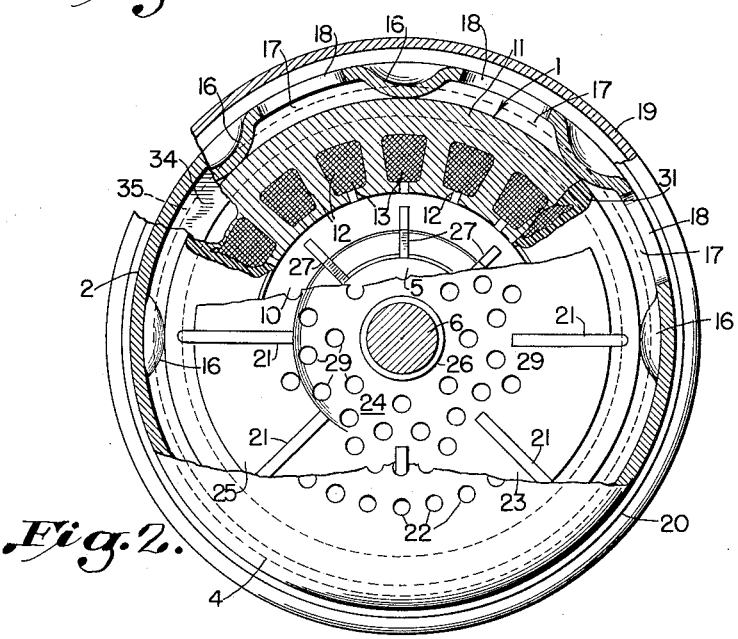

In the drawing:

Figure 1 is a view of a motor with parts broken away and sectioned to show the details of the motor; and Figure 2 is an end view of the motor with parts broken away to show the details of the motor.

Referring to the drawing, an annular stator assembly 1 is secured within a tubular metal frame or housing 2 having end bells 3 and 4 at opposite ends thereof. A cylindrical rotor 5 is secured on a rotor shaft 6 which is journaled within suitable bearings in the respective end bells 3 and 4 to support the rotor 5 within the bore of the annular stator. Only one shaft bearing 7 is shown in the drawing and it is secured within a hub 8 in the end bell 4 to rigidly support the bearing. A similar bearing, not shown, is also provided in the opposite end bell 3.

The rotor is a conventional squirrel-cage variety having a plurality of rotor bars 9 which extends axially of the rotor. The bars 9 are electrically connected at each end by end rings 10 in the conventional manner.

The annular stator assembly 1 comprises a laminated stator core 11 having a plurality of axial openings or slots 12. A winding 13 is disposed within the slots 12 and extends axially of the core as at 14 and 15. During the operation of the motor, a substantial amount of heat is generated within the winding 13, due to the relatively high current input. The winding 13 is conventionally cooled to carry away the heat generated and to thereby increase the permissible power input without damage to the stator winding.

In accordance with the illustrated embodiment of the invention, the tubular frame 2 is formed with a plurality of circumferentially spaced longitudinal depressions 16 which securely grip the outer periphery of the core and secure the core and winding within the frame. A plurality of circumferentially spaced passages 17 are established between the stator and the frame by the spaced depressions. The passages 17 direct air over the stator core and carry away the heat generated in the winding. An opening 18 is provided in the frame intermediate the length of each passage for the discharge of the air which is drawn into the motor through the end bell 4. A louver or directional cover 19 encircles the openings and is provided with a radially offset flange 20 which is spot welded or otherwise secured to the frame to the side of openings 18 adjacent end bell 4. The louver 19 makes the motor drip proof and also directs the discharging air over the end of the motor opposite the end from which the air enters to cool the adjacent motor components.

A plurality of fan blades 21 draw air in through the end bell 4 which is suitably perforated as at 22 to allow free entrance of air. The blades 21 are secured to the outer periphery of a blade support 23 having a central conical portion 24 connecting an outer radial portion 25 and a flange or hub 26. The conical portion 24 opens toward the end bell 4 and the hub 26 is press fitted or otherwise secured to shaft 6 to dispose the radial portion 25 in axially spaced relation to the end 14 of winding 13. As the shaft rotates, the fan blades 21 draw air in through the perforations 22 and discharge it to the passages 17 and openings 18.

Fan blades 27 and 28 are integrally cast with the opposite end rings 10 adjacent each of the cast rotor bars 9 to carry the heat from the rotor 5 into adjacent air spaces to cool the rotor.

The blades 27 adjacent the fan support plate terminate immediately adjacent the back of fan plate 23 with a close running clearance therebetween. The conical portion 24 of the fan blade support 23 is disposed beneath the fan blades 27 and is perforated as at 29 to allow air to enter adjacent the blades 27. The fan blades 27 draw air inwardly through the perforations 29, circulate the air about the projecting end 14 of the winding 13 and discharge the air via a passage 30 between the winding end 14 and the plate support 22.

To protect the projecting end 14 of the winding 13 from foreign matter carried by the incoming air, a suitable plastic enclosure 31 completely envelops the projecting end 14 to the axial face of the stator core 11. The plastic material is a cured epoxy or any other suitable material having a high heat transfer characteristic.

The peripheral surface of the end ring 10 is cast with an axial embossment 32 in radial alignment with the peripheral surface of the rotor 5. The inner peripheral surface of the plastic envelope 31 is provided with an enlargement 33 having a surface in radial alignment with the inner peripheral surface of the stator core and axially aligned with the embossment 32. This establishes a small running clearance between the adjacent surfaces of the embossment and the enlargement. The small clearance prevents foreign matter carried by the incoming air and circulated by the fan blades 27 from passing through the air gap between the rotor 5 and the stator core 11 and into the opposite end of the housing to the projecting end 15 of the winding 13.

To prevent the air flowing in the discharge passages 17 from carrying foreign matter into the motor end adjacent the projecting winding end 15, an L-shaped baffle 34 seals the passages adjacent end 15. The baffle 34 is secured to the frame 2 and includes a depending leg 35 extending radially inwardly and terminating in abutting relation to the adjacent end surface of the stator core 11. The depending leg 35 effectively seals off the air passages 17 and prevents the air within the passages 17 from being discharged into the motor end space adjacent the projecting end 15 of winding 13.

The present invention provides a simple, high-flow, low-cost ventilating system for dynamoelectric machines.

Various modes of carrying out the invention are contemplated as being within the scope of the following claims particularly pointing out and distinctly claiming the subject matter which is regarded as the invention.

I claim:

1. In a dynamoelectric machine having an annular stator core carrying a winding extending axially from each end of the core and having the core disposed within a frame sealed at one axial end and open at the opposite, one or more air passages between said core and said frame, means to seal said passages adjacent the closed end of the housing to prevent discharge of air from the passages into the closed end of the motor, said frame having discharge openings for said passages intermediate the length of the core to permit the discharge of air from within the motor, fan means interposed between the stator and the open end of the housing and secured to the machine shaft to draw air into the housing and to pass the air over the stator core and then to discharge it through said openings, and a high heat transfer plastic enclosure about the extending stator winding only adjacent the open end of housing to protect the adjacent extended winding from foreign matter.

2. In a dynamoelectric machine having an annular stator core mounted in a shell having a plurality of circumferentially spaced axially extending depressions to securely clamp the core and to establish longitudinal passages therebetween and having a winding extending from each end of the core and having a cylindrical squirrel cage rotor rotatably disposed within the bore of the stator core, a first end member secured to said shell to seal the shell from the surrounding matter, a second end member secured to the opposite end of said shell and having a plurality of perforations to admit air into said shell, a radially extending fan plate secured to the rotor shaft adjacent said second shell and terminating in axially spaced relation to the stator winding, fan blades secured on the outer periphery of the axially outer surface of the plate to draw air into the shell and pass it through said passages, a baffle secured to the shell and depending radially inwardly to the stator core adjacent the discharge end of the passages to seal the passages and prevent passage of air into the sealed end of the shell, a plurality of circumferentially spaced openings in the shell to allow the discharge of the air, a plurality of apertures in the fan plate intermediate the blades and the shaft, and axially extending fan blades integrally cast to both ends of the rotor bars to circulate the adjacent air and to draw air through the apertures in the plate, and a plastic heat transfer material disposed about the stator winding adjacent the fan blades to protect the winding.

3. In a dynamoelectric machine having an annular housing closed at one end and open at the opposite end with the motor shaft extending through the open end, a stator mounted in the housing with longitudinal passages therebetween, a fan plate secured to the shaft and having a perforated portion adjacent the shaft and an imperforated outer portion, a series of circumferentially spaced fan blades secured to the axially outer plate surface to draw air through the open end of the housing and discharge it via said passages, and a series of circumferentially spaced fan blades secured to the rotor adjacent the fan plate to circulate the adjacent air and to draw air through the perforations in the fan plate and discharge the air through said passages.

4. In a dynamoelectric machine, a tubular shell, an annular stator core, radial spacing means secured to said shell and said core to secure the core and shell in spaced relation and to form a series of circumferentially spaced longitudinal passages, said shell having an opening intermediate each of said passages, an end closure secured to one end of the tubular shell to seal the motor from the surrounding atmosphere, a baffle secured to the shell and depending inwardly to the stator core to seal the passage from the sealed end of the shell, an end closure secured to the opposite end of the tubular shell and having a plurality of apertures to admit the surrounding atmosphere into the shell, a fan secured to the shaft adjacent the apertured end closure and having a plate support extending radially outwardly to the stator windings to dispose the outer peripheral surface axially spaced relation to the end of the stator winding, said fan support having a perforated area adjacent the shaft and an imperforated outer area adjacent the stator winding, a plurality of fan blades secured to the imperforated area and extending axially outwardly therefrom, and a plurality of axially extended blades integrally cast with both ends of the rotor bars, the blades adjacent the perforated fan support drawing air inwardly through the perforation and discharging the air between the winding and the imperforated plate to the longitudinal passages.

5. In a dynamoelectric machine having a rotor rotatably supported within the bore of an annular stator core carrying a winding extending axially from the core, a tubular metal shell encircling said core and extending axially thereof, an imperforate end bell secured to one end of the shell to seal the end of the motor from the surrounding matter, a second end bell secured to the opposite end of the shell and having a plurality of perforations to allow entrance of a cooling medium, a plurality of axially extending stamped indentations in said shell protruding radially inwardly to securely grip the core and support the core in radially spaced relation to the outer surface of the shell and establishing axial passages therebetween, said depressions terminating on the core inwardly of the axial core surface adjacent the imperforate end bell, a baffle secured to the shell and extending radially inwardly into abutting engagement with the end of the core surface adjacent the imperforate end bell to seal the passages established by said indentations, and fan means operatively coupled to said rotor adjacent the perforated end bell to draw air inwardly therethrough and discharge it through said passages.

6. In a dynamoelectric machine having a rotor rotatably supported within an annular stator core carrying a winding extending axially therefrom and having the stator core disposed within a housing closed at one end and open at the opposite end, at least one longitudinal air passage between the stator core and the housing, said housing having openings to allow discharge of the air from said passages, fan means disposed between the stator core and the open end of the housing to draw air into the housing, means enclosing the extending winding adjacent the open end of the housing to prevent foreign matter carried by the incoming air from contacting the winding, baffle means disposed within the housing adjacent the closed end of the motor to seal the air passages and substantially prevent the passage of air into the closed end of the housing, fan means disposed between said first fan means and the rotor to circulate the air therebetween, and cooperating surfaces on said rotor and said means enclosing the extending winding to prevent the passage of foreign matter into the gap between the rotor and the stator core.

7. In a dynamoelectric machine having a rotor rotatably supported within an annular stator core carrying a winding extending axially therefrom and having the stator core disposed within a housing closed at one end and open at the opposite end, a plurality of circumferentially spaced axially extending air passages between said core and said housing, said housing having an opening for each of said passages to allow air to discharge from within the housing, fan means disposed between the stator core and the open end of the housing to draw air into the housing, means encasing the extending winding adjacent the open end of the housing and having an annular surface immediately adjacent the stator core and radially aligned therewith, an end ring adjacent the open end of the housing and having an annular surface immediately adjacent the rotor and radially aligned therewith to cooperate with the annular surface of said means encasing the extending winding to prevent foreign matter from entering between said rotor and said stator core a plurality of axially extending fan blades secured to said end ring to carry the heat from the rotor, and baffle means adjacent the closed end of the housing to substantially seal the air passages and prevent foreign matter from entering the closed end of the housing.

References Cited in the file of this patent
UNITED STATES PATENTS

| | | |
|---|---|---|
| 1,159,224 | Hoock | Nov. 2, 1915 |
| 2,193,408 | Knight | Mar. 12, 1940 |
| 2,758,226 | Fisher | Aug. 7, 1956 |

FOREIGN PATENTS

| | | |
|---|---|---|
| 411,596 | Great Britain | June 14, 1934 |
| 836,276 | Germany | Apr. 10, 1952 |